(12) United States Patent
Cases et al.

(10) Patent No.: US 8,276,106 B2
(45) Date of Patent: Sep. 25, 2012

(54) SWARM INTELLIGENCE FOR ELECTRICAL DESIGN SPACE MODELING AND OPTIMIZATION

(75) Inventors: Moises Cases, Austin, TX (US); Jinwoo Choi, Austin, TX (US); Bhyrav Mutnury, Austin, TX (US); Navraj Singh, Brandon, MS (US); Caleb J. Wesley, Winston Salem, NC (US)

(73) Assignee: International Business Machines Corporation, Armonk, NY (US)

( * ) Notice: Subject to any disclaimer, the term of this patent is extended or adjusted under 35 U.S.C. 154(b) by 623 days.

(21) Appl. No.: 12/398,535

(22) Filed: Mar. 5, 2009

(65) Prior Publication Data

US 2010/0229131 A1    Sep. 9, 2010

(51) Int. Cl.
*G06F 17/50* (2006.01)
*G06G 7/48* (2006.01)

(52) U.S. Cl. ........ 716/102; 716/106; 716/110; 716/111; 716/135; 716/136; 716/137; 716/139; 703/2; 703/13; 703/14

(58) Field of Classification Search .................. 716/102, 716/106, 110, 111, 136, 137, 139; 703/2
See application file for complete search history.

(56) References Cited

U.S. PATENT DOCUMENTS

| | | | |
|---|---|---|---|
| 6,480,996 | B1 | 11/2002 | Aji et al. |
| 6,718,291 | B1 * | 4/2004 | Shapiro et al. ..................... 703/2 |
| 7,498,872 | B2 * | 3/2009 | Nishimoto et al. ........... 327/574 |
| 7,636,700 | B2 * | 12/2009 | Owechko et al. ............... 706/46 |
| 7,707,525 | B2 * | 4/2010 | Varon-Weinryb ............ 716/136 |
| 2002/0199156 | A1 * | 12/2002 | Chess et al. ....................... 716/1 |
| 2006/0242614 | A1 | 10/2006 | Wadland et al. |
| 2009/0070721 | A1 * | 3/2009 | Solomon ........................... 716/8 |
| 2009/0173931 | A1 * | 7/2009 | Stumbo ............................. 257/14 |
| 2009/0198386 | A1 * | 8/2009 | Kim et al. ..................... 700/298 |
| 2009/0228846 | A1 * | 9/2009 | McConaghy et al. ............ 716/4 |
| 2010/0014569 | A1 * | 1/2010 | Cases et al. .................... 375/224 |
| 2010/0023307 | A1 * | 1/2010 | Lee et al. ........................... 703/7 |
| 2010/0088081 | A1 * | 4/2010 | Shan et al. ........................ 703/9 |

(Continued)

OTHER PUBLICATIONS

Ho et al.; "OPSO: Orthogonal Particle Swarm Optimization and Its Application to Task Assignment Problems"; Publication Year: 2008; Systems, Man and Cybernetics, Part A: Systems and Humans, IEEE Transactions on; vol. 38 , Issue: 2; pp. 28.*

(Continued)

*Primary Examiner* — Helen Rossoshek
(74) *Attorney, Agent, or Firm* — Yudell Isidore Ng Russell PLLC

(57) ABSTRACT

A method, system, and computer program product for exploring and optimizing an electrical design space. A computer receiving a design space assigns a plurality of initial values (random or predetermined) for optimizing the design space. A particle swarm containing a plurality of particles is created and an optimization of the design space is then performed using the assigned initial values. Following completion of optimization, the global best and personal best for each particle are updated. Velocity vectors and position vectors of the design space are then updated before the computer performs the optimization process again. The process loops, continually updating global and personal bests and velocity and position vectors until a termination criteria is reached. Upon reaching the termination criteria, the best fitness of each particle of the swarm is assigned as an optimized design space. In an alternate embodiment, the particle with the worst target fitness may be assigned.

6 Claims, 3 Drawing Sheets

U.S. PATENT DOCUMENTS

2010/0205122 A1* 8/2010 Abramson ............... 706/12
2011/0161055 A1* 6/2011 Cases et al. ............... 703/1

OTHER PUBLICATIONS

Lei et al.; "MCM Interconnect Test Scheme Based on Ant Colony Algorithm and Particle Swarm Optimization Algorithm"; Publication Year: 2009; Genetic and Evolutionary Computing, 2009. WGEC '09. 3rd International Conference on; pp. 678-681.*

Acan et al.; "Enhanced particle swarm optimization through external memory support"; Publication Year: 2005; Evolutionary Computation, 2005. The 2005 IEEE Congress on; vol. 2; pp. 1875-1882 vol. 2.*

Nenortaite et al.; "Application of particle swarm optimization algorithm to decision making model incorporating cluster analysis"; Publication Year: 2008; Human System Interactions, 2008 Conference on; pp. 88-93.*

Ratnaweera et al.; "Self-organizing hierarchical particle swarm optimizer with time-varying acceleration coefficients"; Publication Year: 2004; Evolutionary Computation, IEEE Transactions on; vol. 8, Issue: 3; pp. 240-255.*

Acan et al.; "Fitness proportional hypermutations within memory-based colonization in particle swarm optimization"; Publication Year: 2009; Soft Computing, Computing with Words and Perceptions in System Analysis, Decision and Control, 2009. ICSCCW 2009. Fifth International Conference on; pp. 1-4.*

Saber et al.; "Economic Load Dispatch of Higher Order Cost Polynomials Using Modified Particle Swarm Optimization"; Publication Year: 2007; Industrial Informatics, 2007 5th IEEE International Conference on; vol. 2; pp. 1203-1208.*

Saber et al.;"Constrained non-linear optimization by modified particle swarm optimization"; Publication Year: 2007; Computer and information technology, 2007. iccit 2007. 10th international conference on; pp. 1-7.*

Zhen et al.; "A novel intelligent particle optimizer for global optimization of multimodal functions"; Publication Year: 2007; Evolutionary Computation, 2007. CEC 2007. IEEE Congress on; pp. 3272-3275.*

* cited by examiner

SWARM INTELLIGENCE FOR ELECTRICAL DESIGN SPACE MODELING AND OPTIMIZATION

BACKGROUND OF THE INVENTION

1. Technical Field

The present invention relates in general to computer systems, and in particular to data-processing systems. Still more particularly, the present invention relates to a system for exploring and optimizing an electrical design space using particle swarm intelligence.

2. Description of the Related Art

Designs of today's electronic system have become extremely complex, specifically, the electrical design and verification of complex electronic systems. Electrical design, modeling, simulation, and analysis stages of complex electronic structures, where the number of environmental and manufacturing varying design parameters are extremely high, often require a great deal of time or resources of an electronic system. Techniques like Monte Carlo require huge number of simulations in order to achieve a meaningful outcome distribution with a high confidence level. These and similar statistical techniques are not effective to explore highly nonlinear design spaces, which tremendously limits the scope of the application of these statistical approaches.

SUMMARY OF THE INVENTION

Disclosed is a method, system, and computer program product for exploring and optimizing an electrical design space. A computer receiving a design space assigns a plurality of initial values (random or predetermined) for optimizing the design space. A particle swarm containing a plurality of particles is created and an optimization of the design space is then performed using the assigned initial values. Following completion of optimization, the global best and personal best for each particle are updated. Velocity vectors and position vectors of the design space are then updated before the computer performs the optimization process again. The process loops, continually updating global and personal bests and velocity and position vectors until a termination criteria is reached. Upon reaching the termination criteria, the best fitness of each particle of the swarm is assigned as an optimized design space. In an alternate embodiment, the particle with the worst target fitness may be assigned.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, will best be understood by reference to the following detailed descriptions of an illustrative embodiment when read in conjunction with the accompanying drawings, wherein:

DETAILED DESCRIPTION OF THE PREFERRED EMBODIMENT

The illustrative embodiments provide a method, system, and computer program product for exploring and optimizing an electrical design space using swarm intelligence, in accordance with one embodiment of the invention.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that term is utilized.

Figure 1:
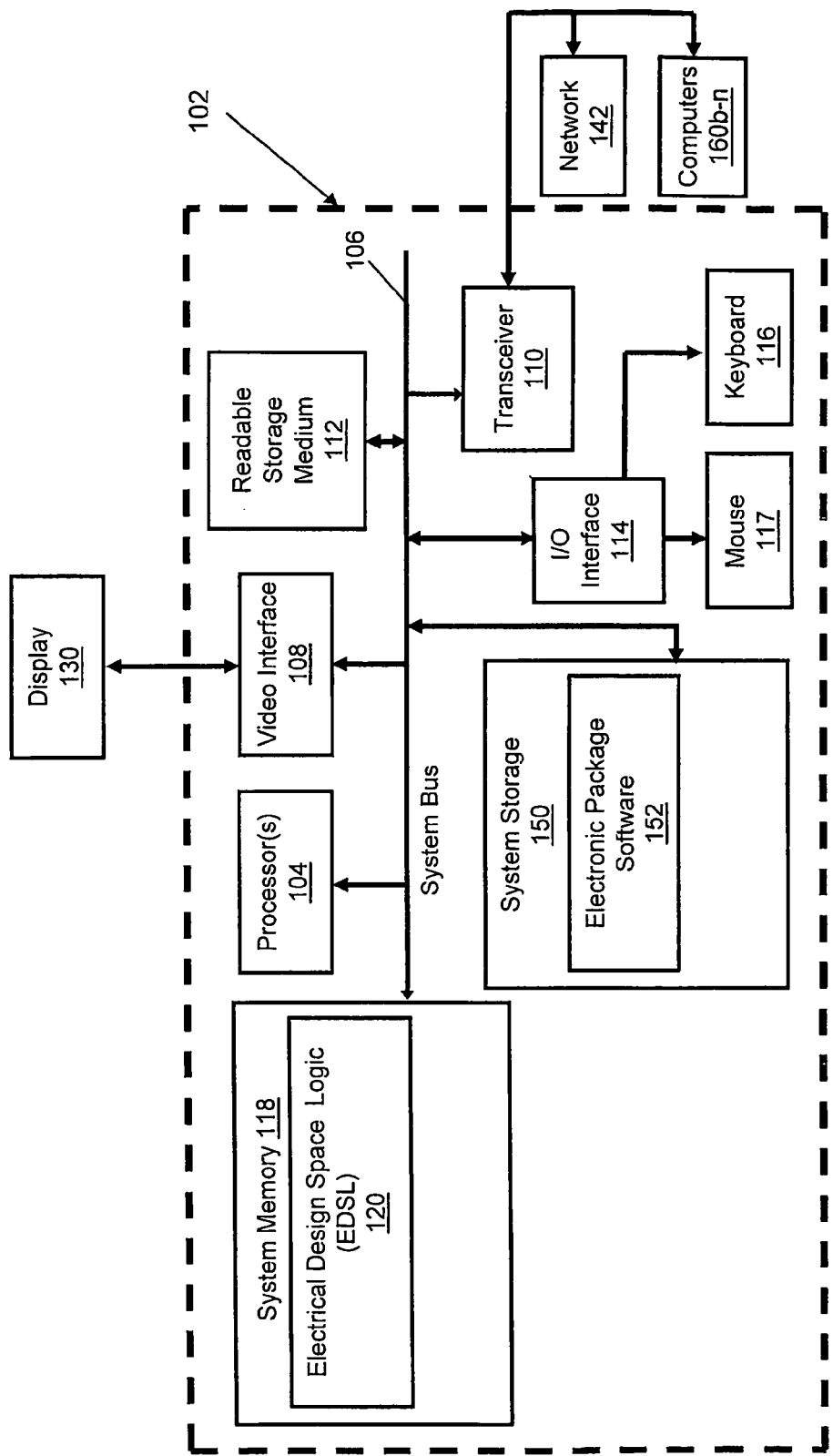
FIG. 1 is a block diagram of a computer in which the present invention may be implemented.

With reference now to FIG. 1, there is depicted a block diagram of a computer 102 in which the present invention may be implemented. Computer 102 includes a processor 104 that is coupled to a system bus 106. A transceiver 110, connected to system bus 106, enables computer 102 to connect to network 142 and computers 160*a-n*, via wired or wireless mechanisms. Video Interface 108, coupled to system bus 106, allows for the connection of a Display 130 to computer 102 enabling the view of an electrical design space (including text and graphics) for use by a user of computer 102. System bus 106 also enables communication with a hardware-based readable storage medium 112 (e.g., Compact Disk-Read Only Memory (CD-ROM), flash drive memory, etc). Input/Output (I/O) Interface 114, also connected to system bus 106, permits user interaction with computer 102, such as data entry via keyboard 116 or mouse 117.

Computer 102 also comprises a system storage 124, which is connected to system bus 106. System Storage 124 comprises electronic package software 152.

Computer 102 also comprises system memory 118, which is connected to system bus 106. As shown, system memory 118 also comprises electrical design space logic (EDSL) 120 for exploring and optimizing an electrical design space. EDSL 120 includes code for implementing the processes described in FIGS. 2-3. In one embodiment, computer 102 is able to utilize EDSL 120 to optimize electrical design space for an electronic package and interconnect subsystem using swarm intelligence, as described in greater detail below in FIGS. 2-3.

As illustrated and described herein, computer 102 may be a computer or computing device having the required hardware components and programmed with EDSL 120, executing on the processor to provide the functionality of the invention. The hardware elements depicted in computer 102 are not intended to be exhaustive, but rather are representative to highlight essential components required by and/or utilized to implement the present invention. For instance, computer 102 may include alternate memory storage devices such as magnetic cassettes, Digital Versatile Disks (DVDs), Bernoulli cartridges, and the like. These alternate configurations of components and other variations are intended to be within the spirit and scope of the present invention.

Figure 2:
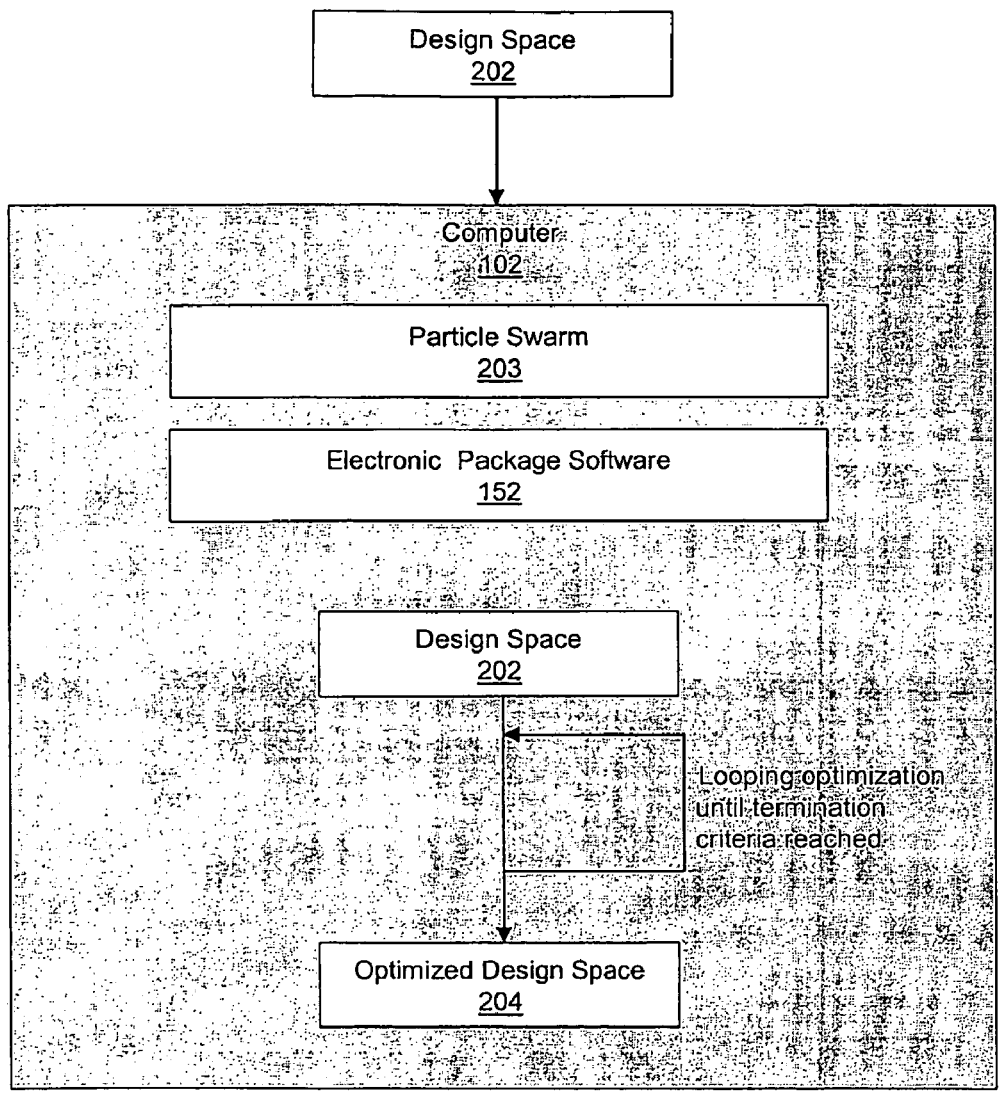
FIG. 2 is a block diagram of an exemplary system for exploring and optimizing an electrical design space, according to one embodiment.

With reference now to FIG. 2, there is illustrated an exemplary system for exploring and optimizing an electrical design space using particle swarm intelligence, in accordance with one embodiment of the invention. In one embodiment, computer 102 receives a design space 202 for optimization. EDSL 120 assigns a plurality of initial values for each electrical parameter within design space 202. The initial values may be random or predetermined. Additionally the values may operate within a numerical specific range (e.g., 2.15-3.45). EDSL 120 generates a plurality of particles of a particle swarm 203 and assigns initial velocity vectors for each particle and position vectors for particle swarm 203. Each particle of the particle swarm is an individual entity which remembers its personal best fit for a target operation from repeated assigned values. A particle may also communicate with other nearby particles to assist in determining a personal or global best. Each particle may represent a value corresponding to a particular entity within the design space. The best fitness for a particular particle is the value, or range of values, for which that particle accomplishes an assigned task. EDSL 120 may then perform an optimization of design space 202 using the initial values by running a simulation (e.g., Hspice® Simulation). During the simulation, EDSL 120 calculates a fitness value for each particle of particle swarm 203 from the assigned initial values. Using the resultant fitness values of the simulation, the global best data for the particle swarm and personal best data for each individual particle of particle swarm 203 are updated. The global best fitness includes best fitness of the each individual particle, or of the swarm of particles as a whole. After each optimization loop, EDSL 120 determines if a termination criteria has been reached. When the termination criteria has not been reached, the velocity vectors for each particle and position vectors for particle swarm 203 are updated with new values, and the optimization process is performed again. An optimization process may be limited to a certain termination criteria (e.g., running an optimization a predetermined amount of times, for predetermined variables only). The process may continue for the assigned values for the variables within design space 202, until the termination criteria has been reached. Based on the fitness value, the global best of particle swarm 203 and particle best of each particle is stored on Computer 102.

Upon reaching the termination criteria, an optimized design space 204 is created using an optimized fitness. The optimized fitness incorporates the best fitness values of the velocity vectors for each particle and the best fitness values of the position vectors of particle swarm 203. In an alternate embodiment, worst fitness values for each particle and the particle swarm 203 may also be used.

Figure 3:
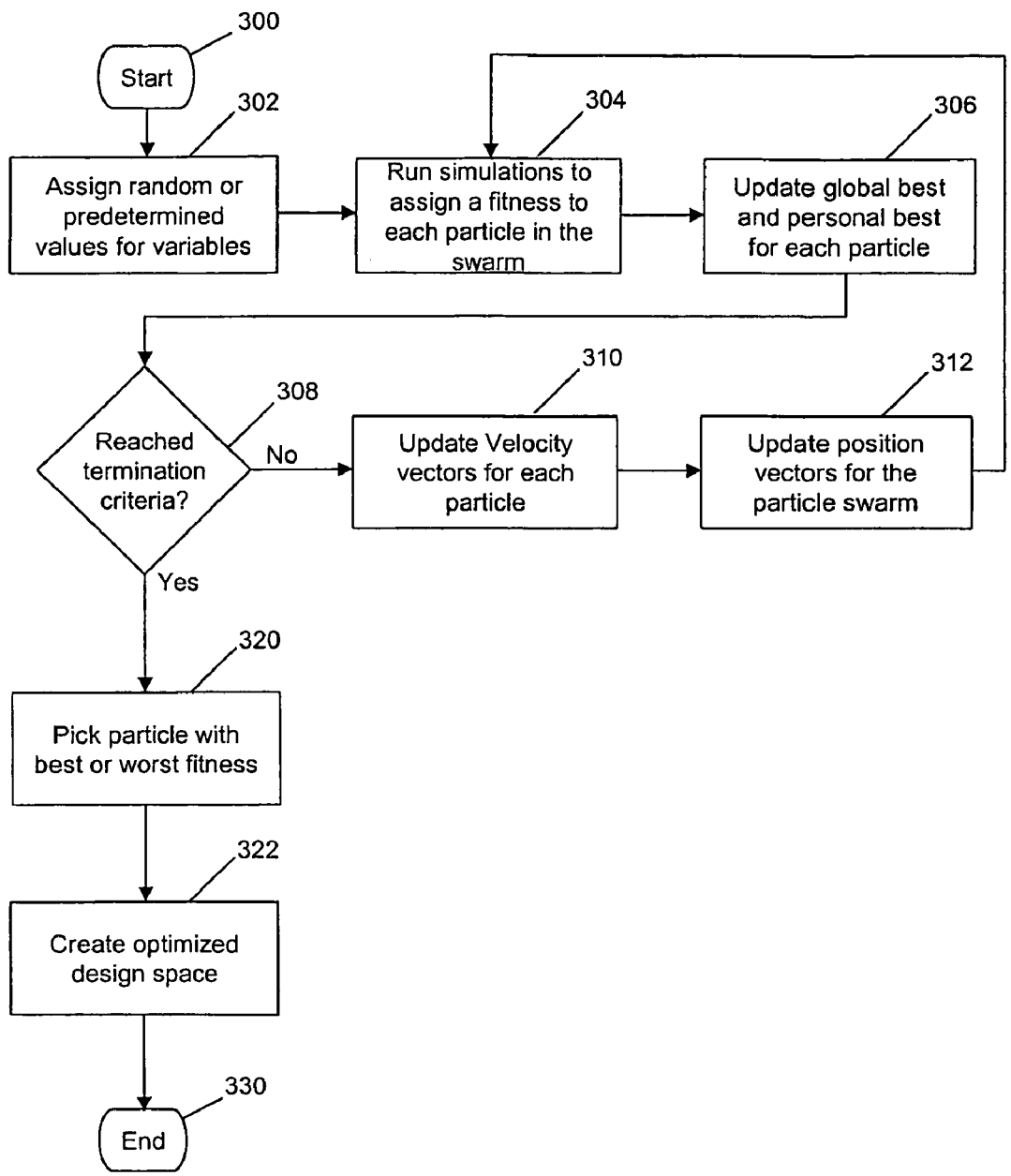
FIG. 3 is a high-level logical flowchart of the process for exploring and optimizing an electrical design space, according to one embodiment.

With reference now to FIG. 3, there is provided a high-level flow chart of an exemplary method for exploring and optimizing an electrical design space using swarm intelligence, in accordance with one embodiment of the invention. After initiator block 300, initial values (random or predetermined) are assigned for the variables in the electrical space and for velocity vectors for each particle, and for position vectors for particle swarm 203 (block 302). An optimization simulation is then performed to assign a best fitness to each particle in the particle swarm (block 304). The global best for the swarm and a personal best for each individual particle are then updated after each optimization (block 306). A determination is then made whether a termination criteria for optimization simulations has been reached (block 308). If the termination criteria has not been reached, EDSL selects a next set of values representing next values for each electrical parameter within the design space, and according to a specified numerical range, for the velocity vectors for each particle for running a next optimization simulation (block 310). The position vectors for each particle are also updated with new values (block 312). The process then loops back to block 304 and a next optimization is performed.

When the termination criteria has been reached, the best (or worst) fitness velocity vector for each particle and best (or worst) fitness position vector for the particle swarm are selected and assigned as optimized values within the design space (block 320). The design space is then assigned as an optimized design space incorporating the calculated best fitness values from the optimized values calculated during the optimization simulations (block 322). The process then ends at terminator block 330.

In the flow charts above, one or more of the methods are embodied such that a series of steps are performed when the computer readable code is executed on a computing device. In some implementations, certain steps of the methods are combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

Although aspects of the present invention have been described with respect to a computer processor and program application/logic, it should be understood that at least some aspects of the present invention may alternatively be implemented as a program product for use with a data storage system or computer system. Programs defining functions of the present invention can be delivered to a data storage system or computer system via a variety of signal-bearing media, which include, without limitation, non-writable storage media (e.g. CD-ROM), writable storage media (e.g. network attached storages, hard disk drive, read/write CD-ROM, optical media), and communication media, such as computer and telephone networks including Ethernet. It should be understood, therefore, that such signal-bearing media, when carrying or encoding computer readable instructions that direct method functions of the present invention, represent alternative embodiments of the present invention. Further, it is understood that the present invention may be implemented by a system having means in the form of hardware, software, or a combination of software and hardware as described herein or their equivalent. Additionally, the present invention may be implemented in a machine in the form of a computer-readable storage medium having a plurality of instructions embodied executing on a processing device.

Having thus described the invention of the present application in detail and by reference to illustrative embodiments thereof, it will be apparent that modifications and variations are possible without departing from the scope of the invention defined in the appended claims. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A method for exploring and optimizing an electrical design space, the method comprising:
   a computer receiving a design space that is an electrical design space of a complex electronic system;
   generating a plurality of particles of a particle swarm, wherein the particle swarm includes an initial position vector;
   assigning a plurality of initial values for each electrical parameter of the design space, wherein the initial values include an initial velocity vector value for each particle;
   the computer calculating a fitness for each particle of the particle swarm;
   performing an optimization of the design space using the plurality of initial values and the calculated fitness for each particle of the particle swarm;
   in response to the completion of the optimization of the design space:
      updating a global best value for the particle swarm based on the calculated fitness;
      updating a personal best value for each particle based on the fitness; and
      determining if the optimization has reached a termination criteria, wherein the termination criteria comprises a predetermined amount of times that an optimization can be run for one or more predetermined variables; and
   in response to determining that a termination criteria has been reached, the computer creating and outputting an optimized design space using an optimized fitness incorporating the global best value for the particle swarm and the personal best value for each particle of the particle swarm, wherein the optimized fitness also includes a global worst value for the particle swarm and a personal worst value for each particle of the particle swarm.

2. The method of claim 1, further comprising, in response to determining that the optimization has not reached the termination criteria:
   selecting a next velocity vector for each particle;
   selecting a next plurality of position vectors for the particle swarm;
   performing a next optimization of the design space using the next velocity vector for each particle and the next position vectors for the particle swarm; and
   in response to the completion of the next optimization of the design space:
      updating the global best value for the particle swarm based on the calculated fitness; and
      updating the personal best value for each particle based on the fitness.

3. A computer comprising:
   a processor;
   a memory coupled to the processor;
   processing logic executing on the processor that:
      receives a design space that is an electrical design space of a complex electronic system;
      generates a plurality of particles of a particle swarm, wherein the particle swarm includes an initial position vector;
      assigns a plurality of initial values for each electrical parameter of the design space, wherein the initial values include an initial velocity vector value for each particle;
      calculates a fitness for each particle of the particle swarm;
      performs an optimization of the design space using the plurality of initial values and the calculated fitness for each particle of the particle swarm;
      in response to the completion of the optimization of the design space:
         updates a global best value for the particle swarm based on the calculated fitness;
         updates a personal best value for each particle based on the fitness; and
         determines if the optimization has reached a termination criteria, wherein the termination criteria comprises a predetermined amount of times that an optimization can be run for one or more predetermined variables; and
      in response to determining that a termination criteria has been reached, creates an optimized design space using an optimized fitness incorporating the global best value for the particle swarm and the personal best value for each particle of the particle swarm, wherein the optimized fitness also includes a global worst value for the particle swarm and a personal worst value for each particle of the particle swarm.

4. The computer of claim 3, the processing logic further comprising logic that, in response to determining that the optimization has not reached the termination criteria:
   selects a next velocity vector for each particle;
   selects a next plurality of position vectors for the particle swarm;
   performs a next optimization of the design space using the next velocity vector for each particle and the next position vectors for the particle swarm; and
   in response to the completion of the next optimization of the design space:
      updates the global best value for the particle swarm based on the calculated fitness; and
      updates the personal best value for each particle based on the fitness.

5. A hardware-based computer-readable storage medium having a plurality of instructions stored therein, wherein the plurality of instructions, when executed by a processing device, allows a machine to:
   receive a design space that is an electrical design space of a complex electronic system;
   generate a plurality of particles of a particle swarm, wherein the particle swarm includes an initial position vector;
   assign a plurality of initial values for each electrical parameter of the design space, wherein the initial values include an initial velocity vector value for each particle;
   calculate a fitness for each particle of the particle swarm;
   perform an optimization of the design space using the plurality of initial values and the calculated fitness for each particle of the particle swarm;
   in response to the completion of the optimization of the design space:
      update a global best value for the particle swarm based on the calculated fitness;
      update a personal best value for each particle based on the fitness; and
      determine if the optimization has reached a termination criteria, wherein the termination criteria comprises a predetermined amount of times that an optimization can be run for one or more predetermined variables; and
   in response to determining that a termination criteria has been reached, create and output an optimized design space using an optimized fitness incorporating the global best value for the particle swarm and the personal best value for each particle of the particle swarm, wherein the optimized fitness also includes a global worst value for the particle swarm and a personal worst value for each particle of the particle swarm.

6. The hardware-based computer-readable storage medium of claim 5, the plurality of instructions further comprising instructions for enabling the machine to, in response to determining that the optimization has not reached the termination criteria:

select a next velocity vector for each particle;

select a next plurality of position vectors for the particle swarm;

perform a next optimization of the design space using the next velocity vector for each particle and the next position vectors for the particle swarm; and in response to the completion of the next optimization of the design space:

update the global best value for the particle swarm based on the calculated fitness; and update the personal best value for each particle based on the fitness.

* * * * *